E. H. COSTLOW.
CASTER.
APPLICATION FILED FEB. 8, 1915.

1,139,105.

Patented May 11, 1915.

Witnesses
Robert M. Sutphen
A. J. Hind

Inventor
E. H. Costlow

By Watson E. Coleman
Attorney

UNITED STATES PATENT OFFICE.

EBEN H. COSTLOW, OF ALTOONA, PENNSYLVANIA.

CASTER.

1,139,105.  Specification of Letters Patent.  Patented May 11, 1915.

Application filed February 8, 1915. Serial No. 6,650.

*To all whom it may concern:*

Be it known that I, EBEN H. COSTLOW, a citizen of the United States, residing at Altoona, in the county of Blair and State of Pennsylvania, have invented certain new and useful Improvements in Casters, of which the following is a specification, reference being had to the accompanying drawings.

This invention relates to new and useful improvements in casters and more particularly to what are known in the art as ball bearing casters, the main object of the present invention being the provision of a ball bearing caster which is mounted within a suitable socket and retained in position by removable plates and is provided with means whereby the same may be readily secured to the lower end of a furniture leg.

Another object of the present invention is the provision of a ball bearing caster of the above character which will possess advantages in points of efficiency and durability, is inexpensive to manufacture and, at the same time is simple in construction and operation.

With the above and other objects in view, the invention consists in the novel features of construction, combination and arrangement of parts as will be hereinafter referred to and more particularly pointed out in the specification and claims.

Figure 1:
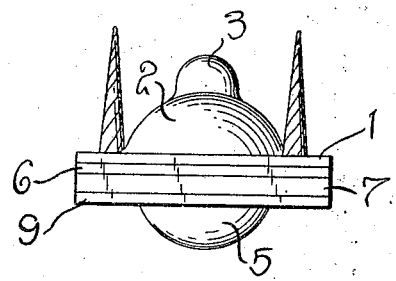
Figure 2:
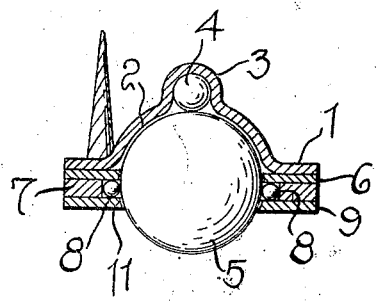
Figure 3:
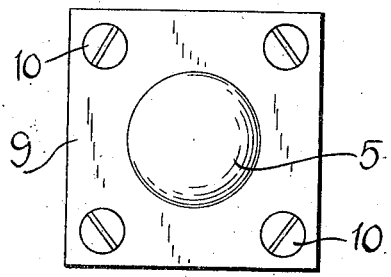

In the accompanying drawings forming a part of this application, Figure 1 is a side elevation of a caster constructed in accordance with my invention. Fig. 2 is a transverse sectional view; and Fig. 3 is a bottom plan view.

In carrying out my invention, I provide what will be known as the base plate and which is generally indicated in the accompanying drawing by the numeral 1. This base plate 1 is provided with a socket 2 substantially hemispherical and the socket is provided at its central portion with an extension 3 and arranged within this extended portion 3 of the socket 2 is a ball 4, which forms a bearing for the caster ball 5. From this it will be apparent that the caster ball 5 will rotate upon the ball 4 which is arranged within the extension 3. Mounted upon the base plate 1 and provided with a central opening to receive the caster ball 5, is a bearing plate 6 and mounted upon this bearing plate is a retaining ring 7, the inner edge of which is arranged in spaced relation with the bearing ball 5 and disposed between the bearing ball and the inner edge of the plate 7, are the balls 8. These bearing balls 8 are retained in position by means of the cover plate 9 which is mounted upon the plate 7 and securely held in position by means of the transverse screw bolts 10. These screw bolts 10 will be sufficiently long to extend up into the lower end of the bed post, whereby to rigidly secure the caster to the same. The inner marginal edge of the plate 9 is beveled, as at 11 to correspond to the periphery of the bearing ball 5 and form a retaining means for the same.

From this it will be apparent that I have provided a simple and durable ball bearing caster which can be easily and quickly secured to the lower end of the bed post and provide a removable support for the bed post, whereby the bed can be readily moved about at will.

In assembling the various parts of my improved caster, the ball 4 is first placed within the extension 3 of the socket 2 and the ball 5 is then placed within the socket and adapted to rest upon the ball 4. The bearing plate is then arranged in position upon the base member 1 and the plate 7 mounted upon the plate 6, so that the balls 8 may be readily inserted between the bearing ball 5 and the inner edge of the plate 1. The cover plate 9 is then placed in position to retain the balls 8 against removal and is securely held in position by means of the screw bolts 10.

From the above description taken in connection with the accompanying drawing, it will be readily apparent that I have provided a simple and durable device which can be quickly and readily secured to the lower ends of the bed post and which will form an anti-friction support for the bed, whereby the bed can be readily moved about with comparatively little effort. The device, as a whole, consists of comparatively few parts, can be quickly and readily assembled and at the same time can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

It will be understood that the base member of my improved caster can be made of soft pressed steel, bronzed or plain, as desired.

Having thus described this invention, what I desire to claim as new and secure by Letters Patent, is:—

1. A caster including a base plate provided with a socket, a ball member adapted to be arranged within said socket, a bearing plate mounted upon the base plate, a retaining ring upon the bearing plate, a cover plate arranged over the ring and provided with a central opening through which a portion of the ball projects, and bearing balls disposed between the bearing plate and the cover plate and the first mentioned ball and the retaining ring, as and for the purpose set forth.

2. A caster including a body formed with a socket, and further provided with a continuation at the central portion of the socket, an anti-friction ball arranged within the continuation, a second anti-friction ball disposed within the socket and bearing upon the first ball, said body being provided with a thickened rim and having a race-way formed therein, bearing balls disposed within said race-way, and a retaining plate engaging over the second anti-friction ball and removably attached to the thickened edge of the body to retain the bearing balls in position within the race-way, as and for the purpose set forth.

In testimony whereof I hereunto affix my signature in the presence of two witnesses.

EBEN H. COSTLOW.

Witnesses:
H. PRICE GRAFFINS,
A. J. FILLER.